United States Patent
Sawada et al.

(10) Patent No.: US 6,685,263 B2
(45) Date of Patent: Feb. 3, 2004

(54) SUNROOF ASSEMBLY

(75) Inventors: Kazuki Sawada, Kariya (JP); Chitose Nishiyama, Handa (JP); Tetsuya Hirata, Toyota (JP); Kohichi Itoh, Kariya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/305,170

(22) Filed: Nov. 27, 2002

(65) Prior Publication Data

US 2003/0127884 A1 Jul. 10, 2003

(30) Foreign Application Priority Data

Nov. 28, 2001 (JP) ......................................... 2001-363408

(51) Int. Cl.⁷ ................................................. B60J 10/12
(52) U.S. Cl. .............................. 296/216.06; 396/216.09
(58) Field of Search ............... 296/213, 216.06–216.09, 296/220.01

(56) References Cited

U.S. PATENT DOCUMENTS

| | | | |
|---|---|---|---|
| 4,375,899 A | * 3/1983 | Kajiyama et al. | ...... 296/216.06 |
| 5,727,839 A | * 3/1998 | Ruhringer et al. | .......... 296/213 |
| 6,129,413 A | 10/2000 | Klein | .................... 296/220.01 |
| 6,270,154 B1 | * 8/2001 | Farber | .................... 296/216.09 |
| 6,332,645 B1 | * 12/2001 | Schwarz | ................ 296/216.09 |
| 6,378,935 B2 | * 4/2002 | Dryselius et al. | ...... 296/216.06 |

FOREIGN PATENT DOCUMENTS

DE 3545870 * 6/1987 ............ 296/216.06

* cited by examiner

Primary Examiner—Dennis H. Pedder
(74) Attorney, Agent, or Firm—Finnegan, Henderson, Farabow, Garrett & Dunner, L.L.P.

(57) ABSTRACT

A sunroof assembly which opens and closes a roof opening portion provided on a roof of a vehicle with a plurality of movable panels and which improves the water proof performance of a vehicle width directional end portions at a clearance between a first movable panel in front and a second movable panel positioned in the rear of the first movable panel. The sunroof assembly includes the first movable panel provided at front of the roof opening portion, the second movable panel provided in the rear of the first movable panel, a sealing member extended in the vehicle width direction for sealing a clearance between the first movable panel and the second movable panel when the first movable panel and the second movable panel are closed, and a preventive wall for covering vehicle width directional end portion of the sealing member.

14 Claims, 4 Drawing Sheets

US 6,685,263 B2

SUNROOF ASSEMBLY

This application is based on and claims priority under 35 U.S.C. §119 with respect to Japanese Patent No. 2001-363408 filed on Nov. 28, 2001, the entire content of which is incorporated herein by reference.

FIELD OF THE INVENTION

The present invention relates to a sunroof assembly. More particularly, the present invention pertains to a sunroof assembly which opens and closes a roof opening portion provided on a roof of a vehicle with a plurality of movable panels.

BACKGROUND OF THE INVENTION

A known sunroof assembly including plural movable panels span a roof opening portion in a vehicle width direction is disclosed in U.S. Pat. No. 6,129,413. With the known sunroof assembly, rear ends of plural movable panels are lifted to be tilted, that is, the rear ends of the movable panels are tilted up to open the roof opening portion, and the movable panels are moved in the rearward direction to widely open the roof opening portion. Generally, known sunroof assemblies include a weather strip as sealing member for sealing a clearance between the first movable panel in front and the second movable panel positioned in the rear of the first movable panel when the movable panels are closed and a weather strip for sealing a clearance between the movable panels and the roof opening portion in order to prevent the invasion of the water in a vehicle compartment.

Notwithstanding, with the known sunroof assembly, there is a drawback that vehicle width directional end portions at the clearance between the first movable panel in front and the second movable panel positioned in the rear of the first movable panel, that is, a portion where two weather strips are crossing to contact each other, has low water proof performance compared to other portions. Particularly, when the water is directly applied to the weather strips to have the car washed with a high water pressure, the weather strips may be deformed to allow the water invasion into the vehicle compartment.

A need thus exists for a sunroof assembly for opening and closing a roof opening portion provided on a vehicle roof with a plurality of movable panels which improves the water proof performance of vehicle width directional end portions at a clearance between a first movable panel in front and a second movable panel positioned in the rear of the first movable panel.

SUMMARY OF THE INVENTION

In light of the foregoing, the present invention provides a sunroof assembly which includes a first movable panel provided at the front of a roof opening portion provided on a roof of a vehicle, a second movable panel provided in the rear of the first movable panel, a sealing member for sealing a clearance between the sunroof assembly and a vehicle compartment, and a preventive wall for covering the sealing member.

According to another aspect of the present invention, a sunroof assembly includes a first movable panel provided at the front of a roof opening portion provided on a roof of a vehicle, a second movable panel provided in the rear of the first movable panel, a first sealing member extended in a vehicle width direction for sealing a clearance between the first movable panel and the second movable panel when the first movable panel and the second movable panel are closed, and a first preventive wall formed for covering an end portion of the first sealing member in vehicle width direction.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

Figure 1:
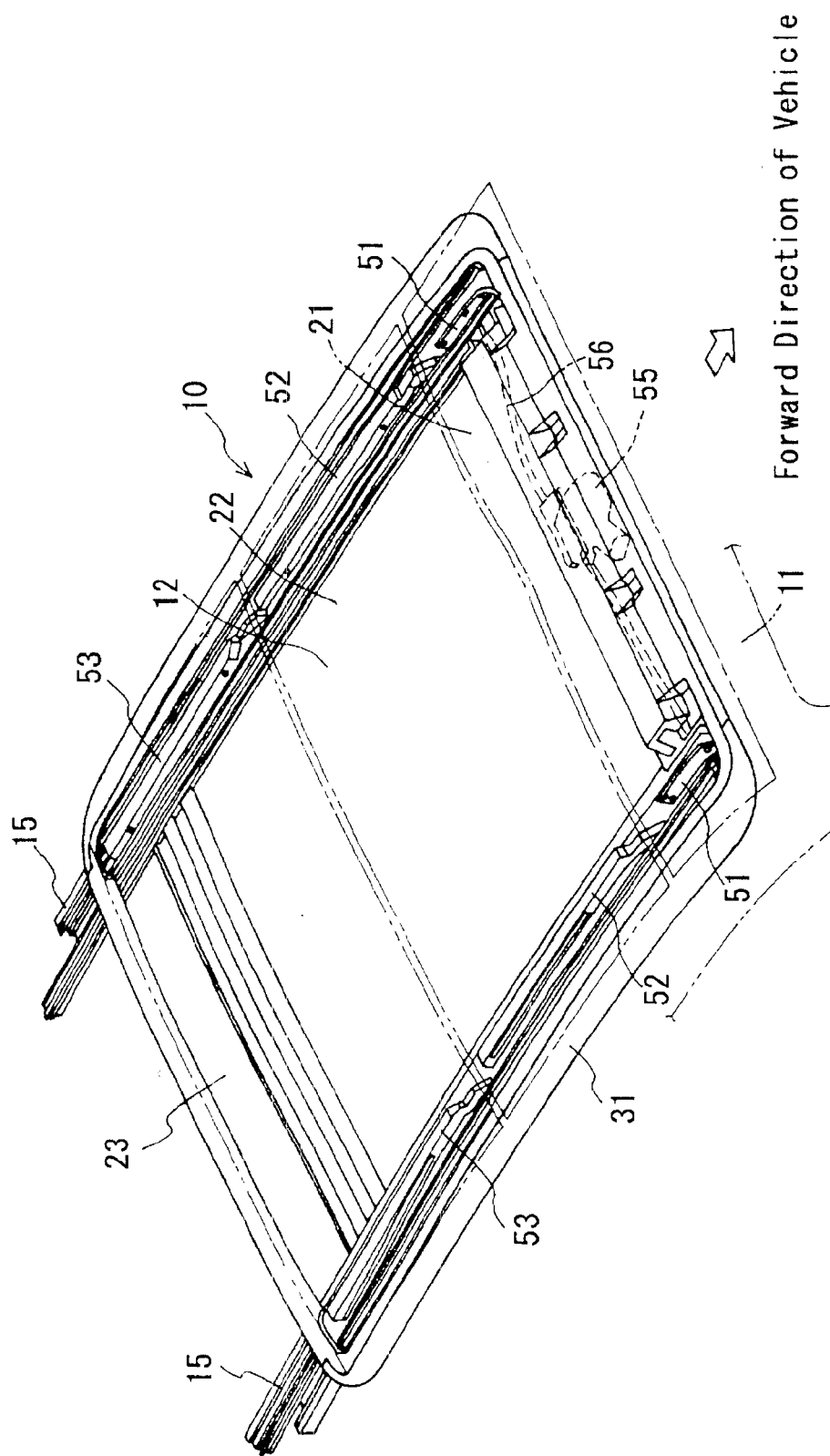
FIG. 1 is a perspective view of a sunroof assembly according to an embodiment of the present invention.
Figure 2:
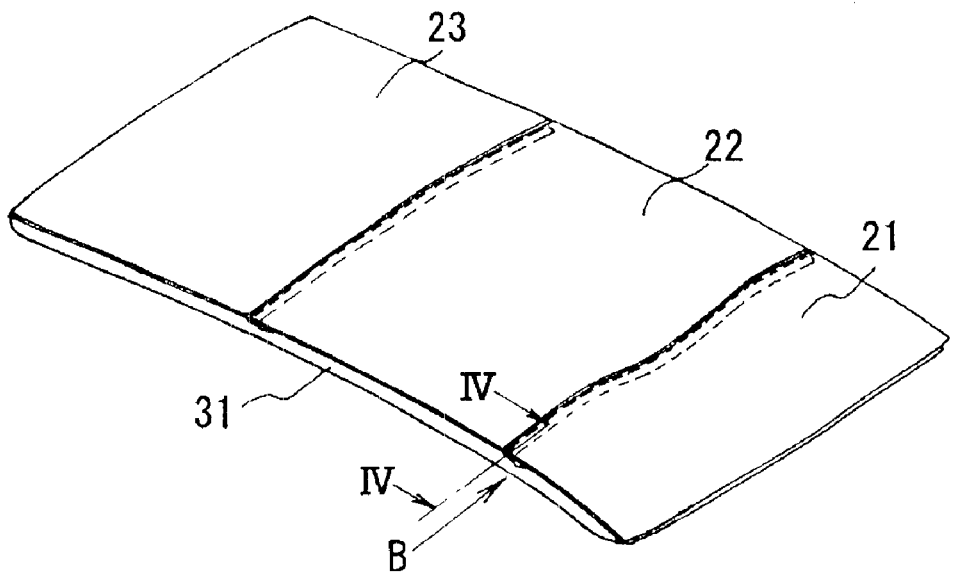
FIG. 2 is a perspective view of the sunroof assembly of FIG. 1 under closed condition.

One embodiment of a sunroof assembly will be explained with reference to the illustrations in the drawing FIGS. 1–6. Referring to FIG. 1, a roof 11 includes a roof opening portion 12. A housing 31 serving as a base construction member of a sunroof assembly 10 is mounted on an internal rim of the roof opening portion 12 via bolts (not shown). The rectangular shape housing 31 includes a window portion 12a serving as a substantial opening portion of the roof opening portion 12 in the central portion thereof.

A pair of guide rails 15, each rail positioned on the right and left of the roof opening portion 12 are extended in the longitudinal direction of the vehicle under the housing 31.

First operational arms 51 are engaged with guide rails 15 respectively via rotational mechanisms (not shown) so that rear end portions of the first operational arm 51 are lifted up rotating about a tip end portion of the first operational arm 51. Second operational arms 52 are engaged with the guide rails 15 respectively at the rear of the first operational arms 51 and third operational arms 53 are engaged with the guide rails 15 respectively at the rear of the second operational arms 52 via rotational sliding mechanisms (not shown) respectively. The second operational arms 52 and the third operational arms 53 are engaged with the guide rails 15 to be movable in the longitudinal direction relative to the guide rails 15 and rear portions of the second operational arms and the third operational arms are lifted up rotating about tip end portions of the second and the third operational arms 52, 53 respectively.

The rotational mechanisms of the first operational arms and the rotational sliding mechanisms of the second and the third operational arms 52, 53 are connected to cables 56 extended from an actuator 55 including a motor and equipped on a bottom surface of the housing 31 in front for performing the sliding and the rotational operation.

The sunroof assembly 10 includes a plurality of movable panels which are normally made from pane and are extended on right, left sides over the roof opening portion 12. A first movable panel 21, a second movable panel 22, and a third movable panel 23 are positioned in order from the front of the vehicle.

The first movable panel 21, the second movable panel 22, and the third movable panel 23 are fixed to the first operational arms 51, the second operational arms 52, and the third operational arms 53 via an attaching frame (not shown) which is mounted with adhesive agent along rim portions at front, rear, right, left ends on the bottom surfaces of the first movable panel 21, the second movable panel 22, and the third movable panel 23. By the operation of the actuator 55, the rear end potion of the first movable panel 21 is tilted up rotating about the front end portion thereof, that is, the tilt-up operation of the first movable panel 21 is achieved. Likewise the first movable panel 21, the second movable panel 22 and the third movable panel 23 perform the tilt-up operation by the operation of the actuator 55 and further perform the movement in the longitudinal direction.

Figure 3:
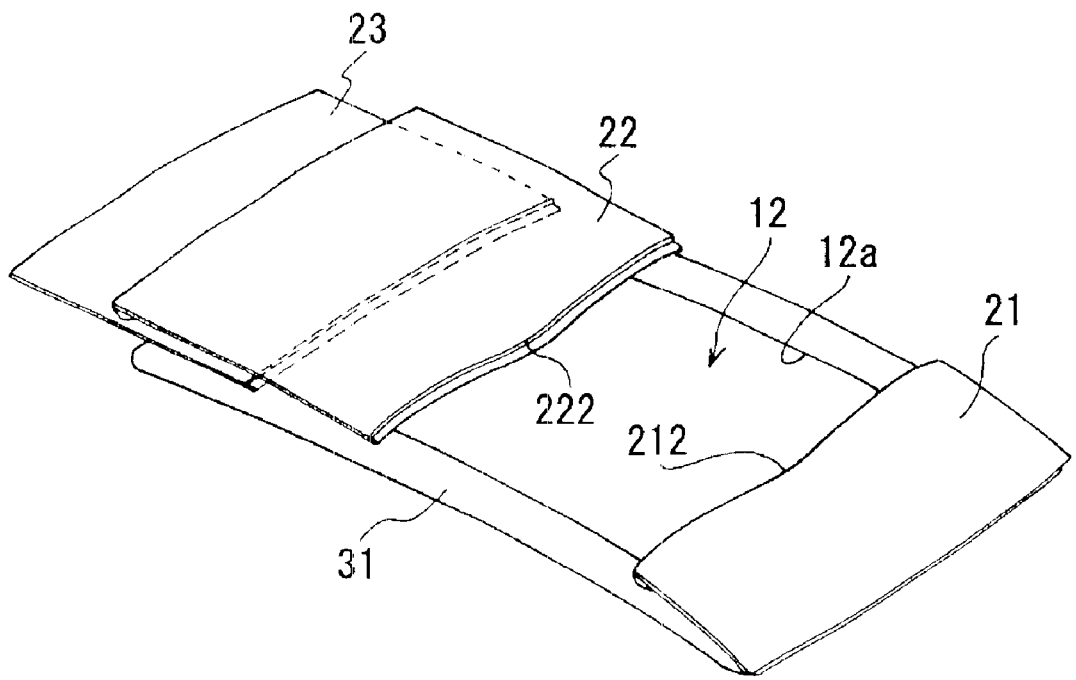
FIG. 3 is the perspective view of the sunroof assembly of FIG. 1 under open condition.

As shown in FIG. 3, an airflow mixing portion 212 positioned at a center of the rear end of the first movable panel 21 and configured to have a gradually inclined recess. The airflow mixing portion 212 functions to reduce the entrainment of the wind in the vehicle compartment during the vehicle running condition. A projection portion 222 is formed on the front end of the second movable panel 22 corresponding to the recess of the air flow mixing portion 212.

A sealing construction of the sunroof assembly 10 will be explained with reference to FIGS. 4–6 as follows.

Figure 6:
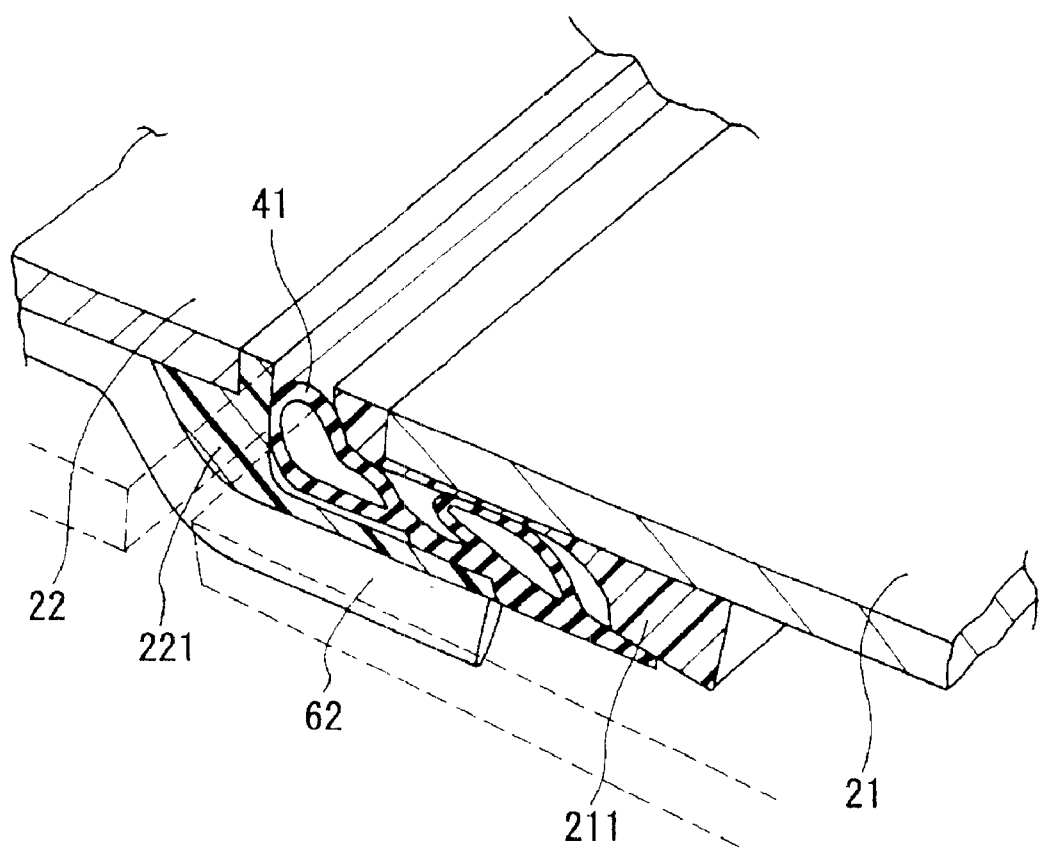
FIG. 6 is a partial cross-sectional view of FIG. 5 taken on line VI—VI of FIG. 4.

As shown in FIG. 6, a liner 211 is provided on the rear end of the first movable panel 21. A retainer 221 is provided on the front end of the second movable panel 22. The liner 211 and the retainer 221 are made of resin. A first weather strip 41 is glued to the retainer 221.

The first weather strip 41 is extended in the vehicle width direction along the retainer 221 and is elastically deformed to contact the liner 221. The first weather strip 41 includes two hollow portions. The liner 221 contacts the first weather strip 41 at three points, two external surfaces of the hollow portions and the front side end portion under the fully closed condition of the sunroof assembly 10. That is, the first weather strip 41 serves as the sealing member for sealing a clearance between the first movable panel 21 and the second movable panel 22 when the first movable panel 21 and the second movable panel 22 are closed.

The roof 11 is provided with a second weather strip 42 for sealing a clearance between the first movable panel 21 and the roof opening portion 12 and between the second movable panel 22 and the roof opening portion 12 respectively. Further, a third weather strip 43 is provided on the roof 11 via the housing 31 for sealing rim portions under the first movable panel 21 and the second movable panel 22. The second and the third weather strips 42, 43 are elastically deformed to contact resin portions (i.e., unitary formed with the liner 211 and the retainer 221 respectively) of the first movable panel 21 and the second movable panel 22. Each weather strip is not shown in FIGS. 1–3.

Figure 4:
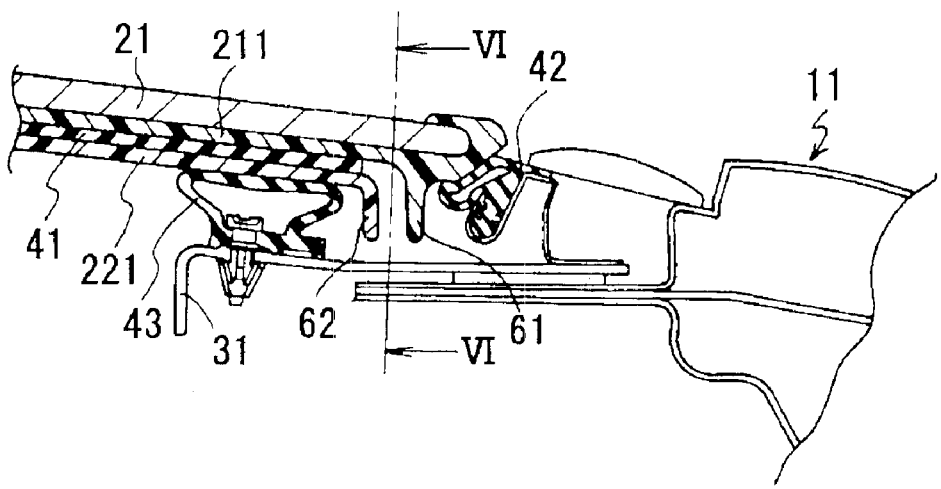
FIG. 4 is a cross-sectional view taken on line IV—IV of FIG. 2.
Figure 5:
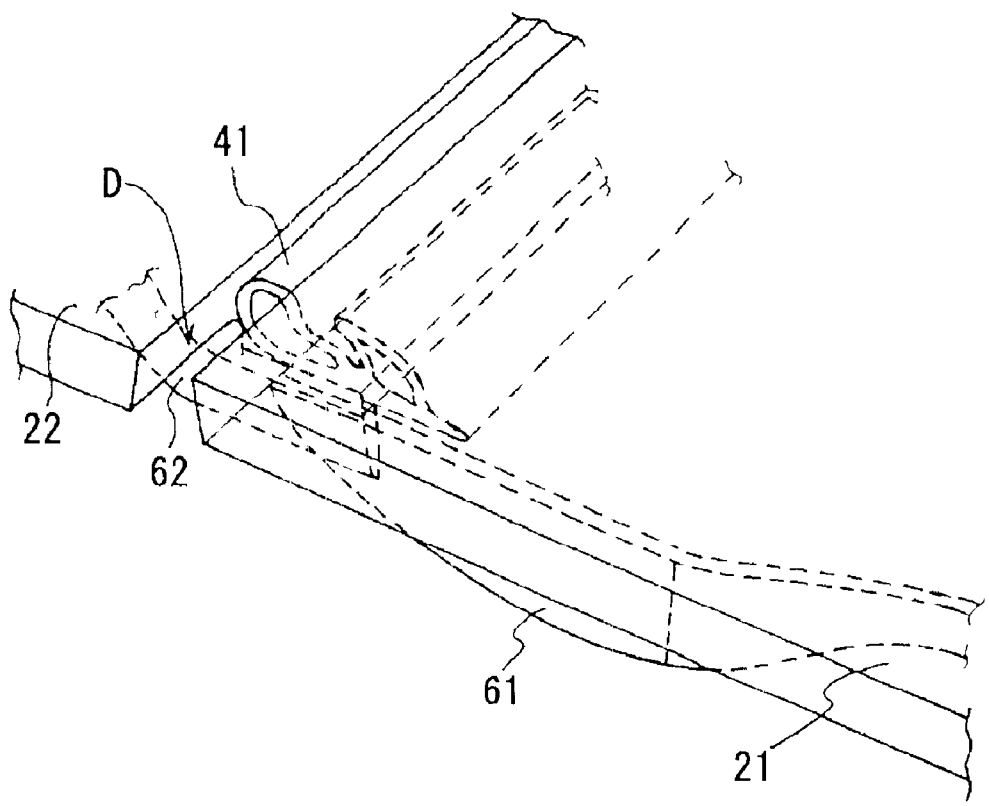
FIG. 5 is a magnified perspective view viewed from B of FIG. 2.

As shown in FIGS. 4–5, a first protective wall 61 is formed on each vehicle width directional end portion on the rear end of the first movable panel 21 for covering each vehicle width directional end portion of the first weather strip 41. The first protective wall 61 is unitary formed with the liner 211 to be downwardly extended along the side face of the vehicle. A bottom end of the first protective wall 61 is configured not to contact the housing 31 under the condition that the first movable panel 21 is closed. A rear end portion of the first preventive wall 61 is positioned outside of a second preventive wall 62, explained hereinafter, in the vehicle width direction.

As shown in FIGS. 4 and 6, the second preventive wall 62, which is positioned under each vehicle width directional end portion of the first weather strip 41 is formed on each vehicle width directional end portion on the front end of the second movable panel 22 and is extended downward along the side surface of the vehicle. The second preventive wall 62 is unitary formed with the retainer 221 at the further inward position in the vehicle width direction relative to the first preventive wall 61. Likewise the first preventive wall 61, a bottom end of the second preventive wall 62 is configured not to contact the housing 31 when the second movable panel 21 is closed.

With the sunroof assembly of the embodiment of the present invention, the direct application of the high pressure water to the vehicle width directional end portions and to the third weather strip 43 can be prevented because the high pressure water invaded via the vehicle width directional end portions of the first weather strip 41 by deforming the second weather strip 42 or from D portion as shown in FIG. 5 contacts the first preventive wall 61. In addition, the water running through the side portion of the first movable panel 21 can be received by the first preventive wall 61.

Further, because the second preventive wall 62 receives the water running through the vehicle width directional end portions of the first weather strip 41 and the water rebounding after contacting the housing 31, the water proof performance can be further improved.

The first and the second preventive wall and other constructions likewise the first movable panel 21 is provided on a rear end of the second movable panel 22 and a front end of the third movable panel 23 for preventing the direct water application to the vehicle width directional end portion of the first weather strip 41 and the third weather strip 43.

According to the embodiment of the sunroof assembly which opens and closes the roof opening portion provided on the vehicle roof with a plurality of movable panels, the water proof performance of the vehicle width directional end portions at the clearance between the first movable panel in front and the second movable panel positioned in the rear of the first movable panel.

According to the embodiment of the sunroof assembly, because the preventive walls are formed for covering the vehicle width directional end portions of the sealing member, even when the high pressure water is applied to the vehicle by washing the vehicle with the high pressure water, the direct application of the high pressure water to the vehicle widths directional end portions of the sealing member can be prevented.

With the sunroof assembly of the embodiment, because the water running through the movable panels can be received by the preventive walls, the waterproof performance can be improved.

With the sunroof assembly of the embodiment, because the water running through the vehicle width directional end portions of the sealing member and the water rebounding from the housing can be received, the waterproof performance can be improved.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A sunroof assembly comprising:
    a first movable panel provided at the front of a roof opening portion provided on a roof of a vehicle;
    a second movable panel provided in the rear of the first movable panel;
    a sealing member for sealing a clearance between the sunroof assembly and a vehicle compartment; and
    a preventive wall provided along a side surface of the panels for sealing a gap defined between the first movable panel and the second movable panel when the first and second movable panels are closed.

2. A sunroof assembly according to claim 1, wherein the preventive wall is formed on at least one of the first and the second movable panels.

3. A sunroof assembly according to claim 2, wherein the preventive wall includes a first preventive wall provided on the first movable panel and a second preventive wall provided on the second movable panel.

4. A sunroof assembly according to claim 3, wherein the first preventive wall and the second preventive wall overlap at each end thereof without contacting each other.

5. A sunroof assembly according to claim 3, wherein the sealing member includes a first sealing member extended in a vehicle width direction for sealing a clearance between the first movable panel and the second movable panel when the first movable panel and the second movable panel are closed, a second sealing member extended in a longitudinal direction on the roof for sealing between the roof and the first movable panel and between the roof and the second movable panel, and a third sealing member provided surrounding a housing connected to the roof for sealing between the housing and the second preventive wall.

6. A sunroof assembly according to claim 4, wherein the sealing member includes a first sealing member extended in a vehicle width direction for sealing a clearance between the first movable panel and the second movable panel when the first movable panel and the second movable panel are closed, a second sealing member extended in a longitudinal direction on the roof for sealing between the roof and the first movable panel and between the roof and the second movable panel, and a third sealing member provided surrounding a housing connected to the roof for sealing between the housing and the second preventive wall.

7. A sunroof assembly according to claim 5, wherein the first preventive wall seals from external elements the first sealing member and the second preventive wall seals from external elements the third sealing member.

8. A sunroof assembly according to claim 6, wherein the first preventive wall seals from external elements the first sealing member and the second preventive wall seals from external elements the third sealing member.

9. A sunroof assembly comprising:
    a first movable panel provided at the front of a roof opening portion provided on a roof of a vehicle;
    a second movable panel provided in the rear of the first movable panel;
    a first sealing member extended in a vehicle width direction for sealing a clearance between the first movable panel and the second movable panel when the first movable panel and the second movable panel are closed; and
    a first preventive wall formed for sealing from external elements an end portion of the first sealing member in the vehicle width direction.

10. A sunroof assembly according to claim 9, wherein the first preventive wall is formed on at least one of the first and the second movable panels.

11. A sunroof assembly according to claim 9, further comprising:
    a second preventive wall positioned in the vehicle width directional end portion of the first sealing member and extended downward along a side surface of the vehicle, the second preventive wall provided on the second movable panel; wherein
    the first preventive wall is provided on the first movable panel.

12. A sunroof assembly according to claim 11, wherein the first preventive wall and the second preventive wall overlap at each end thereof without contacting each other.

13. A sunroof assembly according to claim 11, further comprising:
    a second sealing member extended in a longitudinal direction on the roof for sealing between the roof and the first movable panel and between the roof and the second movable panel; and
    a third sealing member provided surrounding a housing connected to the roof for sealing between the housing and the second preventive wall.

14. A sunroof assembly according to claim 13, wherein the first preventive wall seals from external elements the first sealing member and the second preventive wall seals from external elements the third sealing member.

* * * * *